United States Patent [19]

Taniguchi et al.

[11] 4,300,666
[45] Nov. 17, 1981

[54] CURRENT COLLECTING MEANS IN AN AERIAL CABLEWAY SYSTEM

[75] Inventors: Masaaki Taniguchi; Shinji Nakata, both of Yokohama; Susumu Ueki, Tokyo, all of Japan

[73] Assignee: Nissan Motor Company, Limited, Japan

[21] Appl. No.: 58,772

[22] Filed: Jul. 19, 1979

[30] Foreign Application Priority Data

Aug. 7, 1978 [JP] Japan .................. 53-108130[U]

[51] Int. Cl.³ .............................................. B60M 1/34
[52] U.S. Cl. .................................. 191/23 A; 191/49; 191/59.1
[58] Field of Search ............ 191/45 R, 13, 23 A, 191/33 R, 33 PM, 45 A, 49, 59.1, 22 R

[56] References Cited

U.S. PATENT DOCUMENTS

| 2,675,434 | 4/1954 | Herrmann | 191/23 A |
| 3,345,471 | 10/1967 | Kilburg | 191/45 R |
| 3,983,978 | 10/1976 | Uchiyama | 191/45 R |
| 4,043,436 | 8/1977 | Segar et al. | 191/32 |
| 4,050,555 | 9/1977 | Ross | 191/23 A |
| 4,053,035 | 10/1977 | Uchiyama | 191/45 A |

FOREIGN PATENT DOCUMENTS 2142530 3/1973 Fed. Rep. of Germany.
53-11414 2/1978 Japan.

Primary Examiner—Richard A. Schacher
Attorney, Agent, or Firm—Lane, Aitken, Ziems, Kice & Kananen

[57] ABSTRACT

A current collecting means in an aerial cableway system collecting electric power for driving a self-propelled aerial carriage, is capable of maximization of the lifetime of a current collecting shoe. The current collecting means comprises a current-carrying cable having at least a planar surface on the outer surrounding thereof and a current collecting shoe having a planar contacting surface to be urged onto the planar surface of the cable. The contact between the shoe and cable is carried out in both planar surfaces to prevent uneven wear of the shoe.

4 Claims, 8 Drawing Figures (A)

(B) PRIOR ART

CURRENT COLLECTING MEANS IN AN AERIAL CABLEWAY SYSTEM

BACKGROUND OF THE INVENTION

The present invention relates to a current collecting means for a self-propelled aerial cableway system. More specifically, the invention relates to an improvement in the structure of a current collecting means comprising current-carrying cables and current collecting shoes in sliding contact for supplying electrical power to a driving means of a self-propelled carriage.

Self-propelled aerial cableway systems, used for long mountain ascents and to cross canyons and rivers, are well known in various constructions. Such a system is found in U.S. Pat. No. 3,983,978 to Uchiyama et al, wherein a self-propelled aerial carriage suspended by a pair of parallel supporting cables is disclosed. The aerial cableway system shown by Uchiyama et al employs a pair of cables which are used both to support a carriage and to carry electric power to the carriage. A pair of current collecting shoes, supported by a pantagraph mechanism attached to the carriage, are urged against the inner sides of the cable.

While this construction provides a current collecting means which can maintain a good sliding contact between cables and current collecting shoes and provide a steady supply of electric power to the carriage, it requires a high cost because electrically conductive supporting cables, such as locked coil wire ropes, are used. It will further be seen that cable wear may be accelerated by sliding contact with the shoes.

A different construction is shown in U.S. Pat. No. 4,053,035 to the same Uchiyama et al. This patent discloses a self-propelled aerial cableway carriage supported by a supporting cable through a supporting member. Two current-carrying cables are supported by the supporting cable by a series of holders. A pair of current collecting shoes are in contact with the two current-carrying cables. The current-carrying cables are constantly urged toward one another by the holder which is provided with spring characteristics, so as to maintain a contacting position with the current collecting shoes.

This system disclosed in U.S. Pat. No. 4,053,035, is generally able to provide a current collecting means for a self-propelled aerial cableway which is simplified and can supply a steady flow of electric current to a carriage. However, this system has construction difficulties because:

(1) the supporting cable is apt to sway when subjected to lateral wind thereby causing unsatisfactory contact between the current-carrying cable and current collecting shoes;

(2) the dimensional relationship between the supporting cable and the current-carrying cables is difficult to hold constant through the whole cableway because of errors in assembly and manufacturing tolerances of the holder; and (3) the current-carrying cables as well as the supporting cable are apt to sag in a different ratio.

To overcome the aforementioned disadvantages and difficulties in the prior art, Japanese unexamined patent application publication (Kokai Tokkyo Koho) No. 53-11414, discloses an improved current collecting means for a self-propelled aerial cableway system. This current collecting means for a self-propelled aerial cableway is shown in FIGS. 1 to 3 of the drawings accompanied with the present application.

FIG. 1 shows a cableway system which includes a supporting cable, rope or the like 10 defining a cableway of the system, and current-carrying cables 12 which are disposed substantially parallel to each other and to the supporting cable 10. The current-carrying cables 12 are supported on opposite sides of the cable 10 by means of a bracket 14 with insulators 16 disposed between the supporting cable 10 and the current-carrying cables 12. A self-propelled carriage 18 is suspended by a suspending member 20 from the supporting cable 10 and is fitted with grooved drive wheels 22 (though in FIG. 1 merely a front side wheel is shown) which ride on the supporting cable 10. The carriage 18 is driven by an electric driving means, such as an electric motor 24. A current collecting means 26 is disposed in sliding contact with each of the aerial current-carrying cables 12, so as to supply power for the motor 24.

Each current-carrying cable 12 is held within a groove or cavity 28 formed in an insulating holder 30. The holder 30 is secured to the supporting cable 12 through an arm (not shown).

As shown in FIGS. 2 (A) and 2 (B), conventionally, the current-carrying cable is comprised with hollow cylindrical cable of circular cross-section formed of an electrically conductive material such as copper. The current collecting shoe 34 extends into the bottom opening of the groove or cavity 28 of the insulating holder 30 and is tightly forced against the current-carrying cable 12 so as to maintain a steady supply of power for the motor 24. The current collecting shoe 34 has a lateral dimension less than the width of the cavity 28 in order to permit the shoe 34 to slide smoothly in contact with the current-carrying cable 12 therein, along curved portions of the cable 12. Portions of the shoe 34 are off-center with respect to the cable 12 during movement of the carriage 18 along curved portions of the cableway. This may cause the shoe 34 to wear in an uneven fashion so that its bearing surface is inclined relative to the current-carrying cable 12. Once such an offset occurs, the force urging the shoe 34 against the current-carrying cable 12 tends to hold the shoe 34 in an off-center position, thus making the uneven wear on the bearing surface of the shoe 34 progressively worse. As a result, if a predetermined maximum depth of wear is used to determine the lifelimit of the shoe, such a limit will be reached sooner than if the wear is even, as shown in FIG. 5. In addition, as shown in FIGS. 3(A) and 3(B), such uneven wear is generally unsatisfactory. For example, when the carriage 18 is traversing a curved cable portion such that the shoe 34 is off-center in the opposite way to that in which it has principally worn the shoe 34 may make only a line contact at the point represented by the reference letter P in FIGS. 3(A) and 3(B), or similarly make unsatisfactory contact with the cable 12. This may cause arcing and overheating both of which further shorten the life of the shoe.

In view of the foregoing, the present invention is to provide a current collecting means which assures an areal contact between the current collecting shoe and the current-carrying cable to prevent uneven wear of the shoe thereby to maximize the life of the shoe until its predetermined depth of wear is reached and which maintains the shoe in areal contact with the current-carrying cable even in curved portions of the current-carrying cable to maintain a steady supply of electric power.

SUMMARY OF THE INVENTION

Therefore, it is an object of the present invention to provide a current collecting system superior to the conventional system, even when wear has occurred by guaranteeing contact between the current collecting shoe and current-carrying cable.

Another object of the invention is to provide a current collecting means for an aerial cableway system, which the means comprises a current collecting shoe and current-carrying cable both having flat surfaces in contact with each other so that even if the shoe is off-center with respect to the current-carrying cable, uneven wear is not caused.

The aforementioned objects and advantages accomplished by a current collecting means according to the present invention, in an aerial cable way system having a carriage driven by electric driving means and travelling along a supporting cable, is comprised with a current-carrying cable having at least one planar outer surface; and a current collecting shoe provided on the carriage and having plane contact surface by which the shoe contacts said planar surface of the current-carrying cable.

Preferably, the current-carrying cable is a hollow square-shaped configuration on which the lower planar surface is contacted by the current collecting shoe.

The other objects and advantages of the invention will be understood by the following detailed description of the preferred embodiment of the invention.

BRIEF DESCRIPTION OF THE DRAWINGS

The present invention will be illustrated more fully by way of example with reference to the accompanying drawings, in which.

DESCRIPTION OF THE PREFERRED EMBODIMENT

Figure 1:
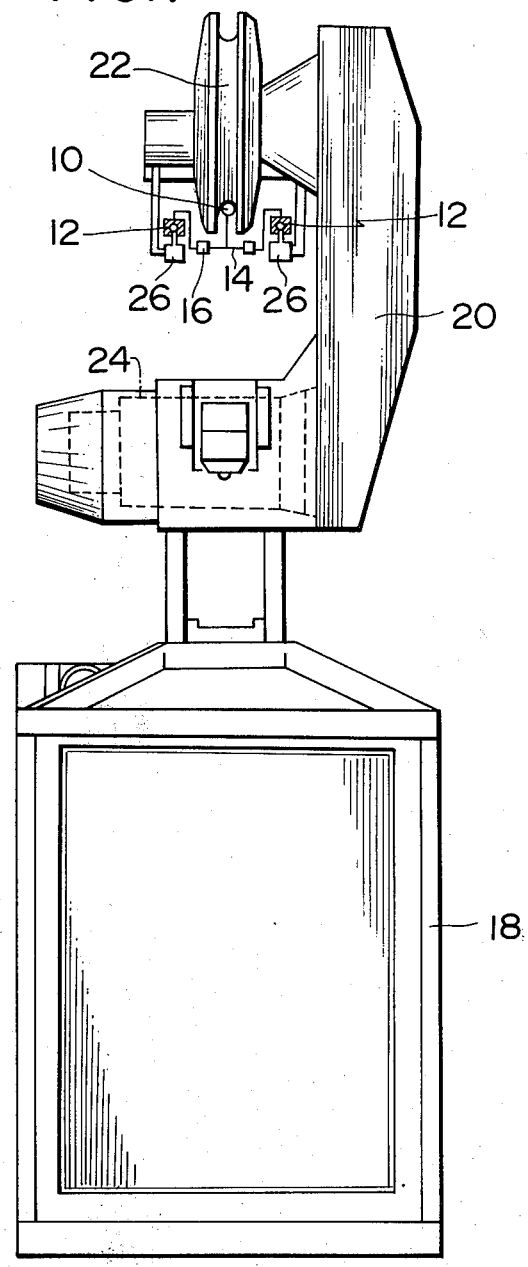
FIG. 1 is a schematic front elevational view of a self-propelled aerial cableway system.
Figure 2A:
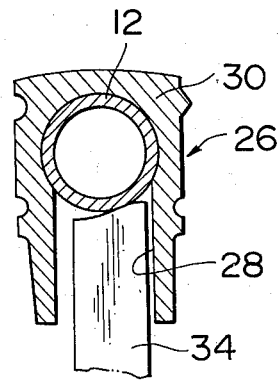
FIG. 2(A) is an enlarged cross-section of a conventional current collecting means.
Figure 3A:
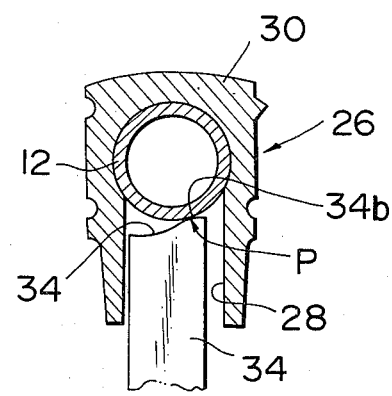
FIGS. 3(A) and 3(B) are views similar to FIGS. 2(A) and 2(B), showing a relationship between the current collecting shoe and the holder on the curved portion of the cableway.
Figure 2B:
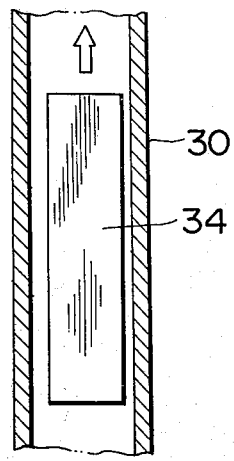
FIG. 2(B) is an enlarged schematic illustration showing a relationship between a current collecting shoe and a holder of a current-carrying cable.
Figure 3B:
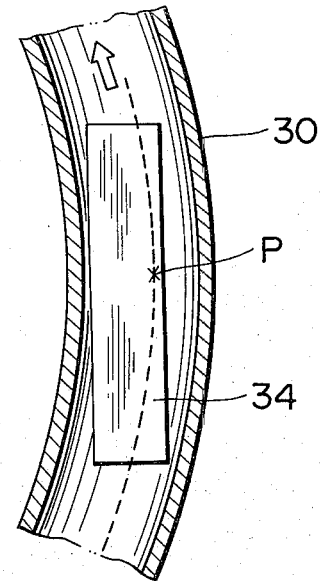
Figure 4:
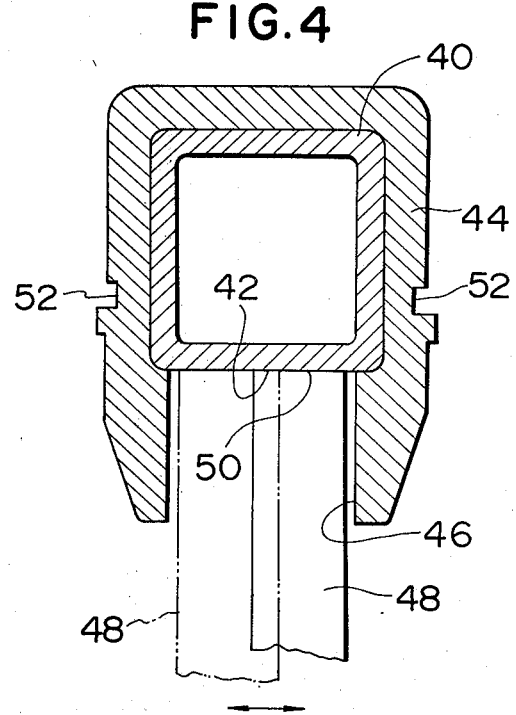
FIG. 4 is an enlarged cross-section of a preferred embodiment of the current collecting means according to the present invention.

Referring now to FIG. 4, a preferred embodiment of a current collecting means in accordance with the present invention will be described. An aerial current-carrying cable 40 is provided with a substantially horizontal plane surface 42, at least on its lower surface. In the preferred embodiment, the current-carrying cable 40 comprises a pipe of electrically conductive material having a square cross-section. An insulating holder 44 surrounds and supports the current-carrying cable 40 in a cavity 46 which is open at its lower side. A current collecting shoe 48 extends into the cavity 46 so that substantially the whole of its upper surface 50 contacts the plane surface 42 of the cable 40 and can slide smoothly therealong. As shown in FIG. 4, the insulating holder 44 is provided with clamp grooves 52 which are engaged by brackets (not shown) supporting the current-carrying cable 40.

It will be understood that the cross-section of the aerial current-carrying cable 40 is not limited to a square form, but may comprise any form, such as a semicircular or triangular form, the only requirement being that it presents a planar surface for sliding contact with the current collecting shoe 48.

Further, the cable need not be constructed as a hollow member, even though a hollow cable is preferred because of its weight and cost. It will be noted that the current collecting shoe 48 is constructed in the same manner as a conventional one, and is narrower than the lower opening of the cavity 46 of the insulating holder 44 in order to permit smooth movement of the shoe along a curved portion of the aerial cableway.

Figure 5:
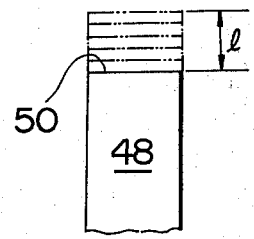
FIG. 5(A) is a schematic illustration of the wear limit of a collecting shoe used in the present invention.
FIG. 5(B) is an illustration, similar to FIG. 5(A), of the wear limit of a current collecting shoe used in the conventional means.
Figure 5:
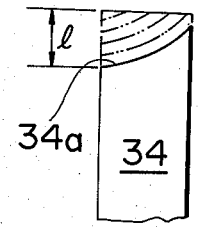

With the present invention, if the accuracy with which the aerial current collecting cable 40 is installed is low, or a lateral movement of the current collecting shoe 48 relative to the cable 40 occurs, the shoe 48 and cable 40 still meet at a planar surface, so that areal contact is maintained and the face of the current collecting shoe 48 is worn evenly and remains planar. Since the collecting shoe 48 will wear to present an abraded surface 50 which remains parallel to the original end surface, it can be used reliably for the maximum amount until the abrasion limit 1, shown in FIG. 5A, is reached. This compares favorably with the illustration in FIG. 5(B) where uneven wear requires a change of the collecting shoe because the abrasion limit 1 has been reached well before all the possible wear has occurred. In this manner, the invention assures an increased life of the collecting shoe.

The present invention has been described in terms of a specific preferred embodiment and with reference to the attached drawings. This, however, is not to be taken in any way as limitative of the present invention which is defined by the appended claims. Many minor modifications to the preferred embodiment will be clear to those skilled in the art, but are intended to remain within the scope of the present invention. For example, as well as being of many different possible shapes, the current-carrying cable 40 may present a surface to contact the shoe 48 which is in any orientation, such as vertical rather than horizontal.

What is claimed is:

1. In an aerial cableway system of the type which includes a supporting cable; at least a pair of current-carrying cables disposed substantially parallel to one another and to the supporting cable; a bracket for supporting said current-carrying cables on opposite sides of the supporting cable, said bracket including insulators disposed between the supporting cable and the current-carrying cable; a self-propelled carriage suspended from the supporting cable which includes grooved drive wheels which ride on the supporting cable, said carriage being driven by electrical driving means; and current collecting means carried on said carriage and disposed in sliding contact with each of said current-carrying cables to supply power to said electrical driving means; an insulating holder for holding each current-carrying cable secured to the supporting cable, said insulating holder defining a bottom-opening cavity for receiving said current collecting shoe therein; said current collecting shoe having a lateral dimension less than the width of the cavity to permit the shoe to slide smoothly in contact with the current-carrying cable therein along curved portions of the current carrying cable, the improvement wherein said current carrying cable is characterized as having at least a lower planar surface, said cable being secured in an upper portion of said holder; and said current collecting shoe is characterized as having a planar upper surface in contact with said lower planar surface of said current-carrying cable.

2. A current collecting means in an aerial cableway system having a self-propelled carriage driven by an electrical driving means and travelling along a supporting cable,
- an insulating holder extending along and suspended from said supporting cable, said insulating holder defining a sequential groove opening at the lower side thereof, said groove being stepped at the vertical intermediate portion thereof, thereby defining upper and lower portions of said holder;
- a hollow square-shaped current-carrying cable being received within said upper portion of said groove of said insulating holder and extending along said supporting cable together with the insulating holder; and
- a current collecting shoe provided on the carriage and having an upper planar surface mating to the lower surface of said current-carrying cable, said current collecting shoe being received in said groove, there being sufficient lateral space between said current collecting shoe and said insulating holder to permit said current collecting shoe to be movable in a lateral direction within said groove and to permit the current collecting means to traverse curved cable portions.

3. A current collecting means in an aerial cableway system having a self-propelled carriage driven by an electrical driving means mounted thereon and travelling along a cableway defined by a supporting cable, comprising:
- an insulating holder extending along said cableway and suspended from said supporting cable, said insulating holder defining a transversely-extending groove at its outer side surface wherein the groove is gripped by suspension means suspended from said supporting cable, said insulating holder also defining an internal groove extending therealong and opening at the lower side thereof, said internal groove having an upper portion and a lower portion divided at a stepped position on said holder;
- a hollow current-carrying cable having a planar contacting surface at the lower side thereof and being received within said upper portion of the internal groove of said insulating holder and extending along said supporting cable; and
- a current collecting shoe having an upper planar surface mating and slidingly contacting with said planar lower surface of said current-carrying cable, said current collecting shoe being received into said holder from said lower opening of said internal groove, there being sufficient lateral space between said current collecting shoe and said insulating holder to permit said current collecting shoe to be movable within said groove in a lateral direction and to permit the current collecting means to traverse curved cable portions.

4. A current collecting means as set forth in claim 3, wherein said current-carrying cable has a square-shaped configuration.

* * * * *